(12) United States Patent
Brand et al.

(10) Patent No.: US 9,998,354 B2
(45) Date of Patent: Jun. 12, 2018

(54) SERVER SELECTION FOR CONTENT DISTRIBUTION

(71) Applicant: Netflix, Inc., Los Gatos, CA (US)

(72) Inventors: Christopher Brand, Livermore, CA (US); David Fullagar, Boulder, CO (US)

(73) Assignee: NETFLIX, INC., Los Gatos, CA (US)

( * ) Notice: Subject to any disclaimer, the term of this patent is extended or adjusted under 35 U.S.C. 154(b) by 83 days.

(21) Appl. No.: 14/289,552

(22) Filed: May 28, 2014

(65) Prior Publication Data

US 2015/0088972 A1    Mar. 26, 2015

Related U.S. Application Data

(60) Provisional application No. 61/881,599, filed on Sep. 24, 2013.

(51) Int. Cl.
*G06F 15/16* (2006.01)
*H04L 12/733* (2013.01)
(Continued)

(52) U.S. Cl.
CPC ........ *H04L 45/126* (2013.01); *H04L 65/4084* (2013.01); *H04L 65/80* (2013.01);
(Continued)

(58) Field of Classification Search
CPC ....... H04L 45/126; H04L 67/10; H04L 67/42; H04L 67/101; H04L 67/1021; H04L 65/4084; H04L 67/18; H04L 65/80
See application file for complete search history.

(56) References Cited

U.S. PATENT DOCUMENTS 6,832,253 B1    12/2004    Auerbach
7,792,989 B2 *    9/2010    Toebes ................ H04L 67/1021
                                                            709/223
(Continued)

FOREIGN PATENT DOCUMENTS

CN          1489069 A      4/2004
CN        101068339 A     11/2007
(Continued)

OTHER PUBLICATIONS

European Patent Office, "Search Report" in application No. 14185822.5-1853, dated Jan. 26, 2015, 14 pages.
(Continued)

*Primary Examiner* — Cheikh Ndiaye
(74) *Attorney, Agent, or Firm* — Artegis Law Group, LLP

(57) ABSTRACT

In an embodiment, a method comprises receiving a first routing table of a first server computer; receiving a second routing table of a second server computer; receiving a request, from a client computer, for information about content servers that hold a media item title, wherein the request includes a client internet protocol address of the client computer; estimating that the first server computer is closer to the client computer than the second server computer is to the client computer based, at least in part, on the client internet protocol address, the first routing table, and the second routing table; sending, to the client computer, a first address to the client computer based, at least in part, on estimating that the first server computer is closer to the client computer than the second server computer, wherein the first address identifies the media item title stored on the first server computer.

22 Claims, 7 Drawing Sheets

(51) Int. Cl.
*H04L 29/06* (2006.01)
*H04L 29/08* (2006.01)

(52) U.S. Cl.
CPC ............ *H04L 67/10* (2013.01); *H04L 67/101* (2013.01); *H04L 67/1021* (2013.01); *H04L 67/18* (2013.01); *H04L 67/42* (2013.01)

(56) References Cited

U.S. PATENT DOCUMENTS

| | | | |
|---|---|---|---|
| 8,527,639 B1* | 9/2013 | Liskov | H04L 67/1004 709/203 |
| 8,909,736 B1* | 12/2014 | Bosch | H04L 67/1093 709/217 |
| 2002/0004846 A1* | 1/2002 | Garcia-Luna-Aceves | G06F 12/1483 709/245 |
| 2002/0007413 A1* | 1/2002 | Garcia-Luna-Aceves | G06F 12/1483 709/229 |
| 2002/0038360 A1* | 3/2002 | Andrews | H04L 29/12066 709/223 |
| 2002/0143946 A1* | 10/2002 | Crosson | H04L 29/12009 709/226 |
| 2002/0169890 A1 | 11/2002 | Beaumont et al. | |
| 2003/0101278 A1* | 5/2003 | Garcia-Luna-Aceves | G06F 12/1483 709/240 |
| 2009/0182896 A1* | 7/2009 | Patterson | H04L 45/02 709/241 |
| 2011/0035497 A1 | 2/2011 | Daly et al. | |
| 2012/0023153 A1* | 1/2012 | Karasaridis | H04L 61/1511 709/203 |
| 2013/0013730 A1* | 1/2013 | Li | H04L 61/1511 709/217 |
| 2013/0297596 A1* | 11/2013 | Mouline | G06F 17/30241 707/724 |

FOREIGN PATENT DOCUMENTS

| | | |
|---|---|---|
| CN | 102148752 A | 8/2011 |
| CN | 103096177 A | 5/2013 |
| EP | 1 322 094 A1 | 6/2003 |
| EP | 2 461 547 A1 | 6/2012 |

OTHER PUBLICATIONS

European Claims in application No. 14185822.5-1853, dated Jan. 2015, 4 pages.

Anonymous: "Why Use a Content Delivery Network (CDN)? Gtmetrix", dated Sep. 23, 2013, 3 pages. Https://web.archive.org/web/20130923185325/http://gtmetrix.com/why-use-a-cdn.htm.

Anonymous: "Routing Table" dated Aug. 1, 2013, retrieved from the Internet: http://en.wikipedia.org/w/index.php?title=Routing_table&oldid=566713095, 4 pages.

* cited by examiner

SERVER SELECTION FOR CONTENT DISTRIBUTION

BENEFIT CLAIM

This application claims the benefit of U.S. Provisional Application No. 61/881,599, filed Sep. 24, 2013.

FIELD OF THE INVENTION

The present disclosure generally relates to data communication networks. The present disclosure relates more specifically to techniques for estimating the closeness of content server computers to client computers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A user, through a client computer, may select a movie or other media to watch and/or listen to on the user's client computer or a device coupled with the client computer. The client computer may request and download the content from one or more content server computers distributed across one or more interconnected networks.

The throughput and latency a client computer observes may be based on many factors. For example, throughput and latency may be affected by the number of networks content data may traverse, the bandwidth of any of the networks traversed, the network congestion of any networks traversed, and the distance between the client computer and the content server computer. Thus, the quality of experience the user experiences may vary drastically based on the time of day, current internet service provider, and the particular content server computer that the client computer is downloading content from.

Content providers, which maintain content server computers, may attempt to improve a user's quality of experience by hosting content on more content server computers. However, a client computer may still inadvertently, and unnecessarily, choose to download content from a content server computer, in which the content may traverse several limited, congested networks. Thus, the user's quality of experience may suffer even though other content server computers may have been sufficient and available.

Content providers may attempt to increase the user's quality of experience by hosting content on a content distribution network ("CDN"). Typically, a CDN is a large distributed system of server computers deployed in multiple data centers across a set of networks distributed across various locations. The goal of a CDN is to deliver high availability and high performance content to client computers. However, hosting content on a CDN may be extremely expensive compared to other solutions. Furthermore, client computers may choose to download content from a costly CDN, which charges the content provider based on how much data is transferred to client computers, when cheaper content server computers were sufficient and available.

SUMMARY

The appended claims may serve as a summary of the invention.

DETAILED DESCRIPTION

Figure 1:
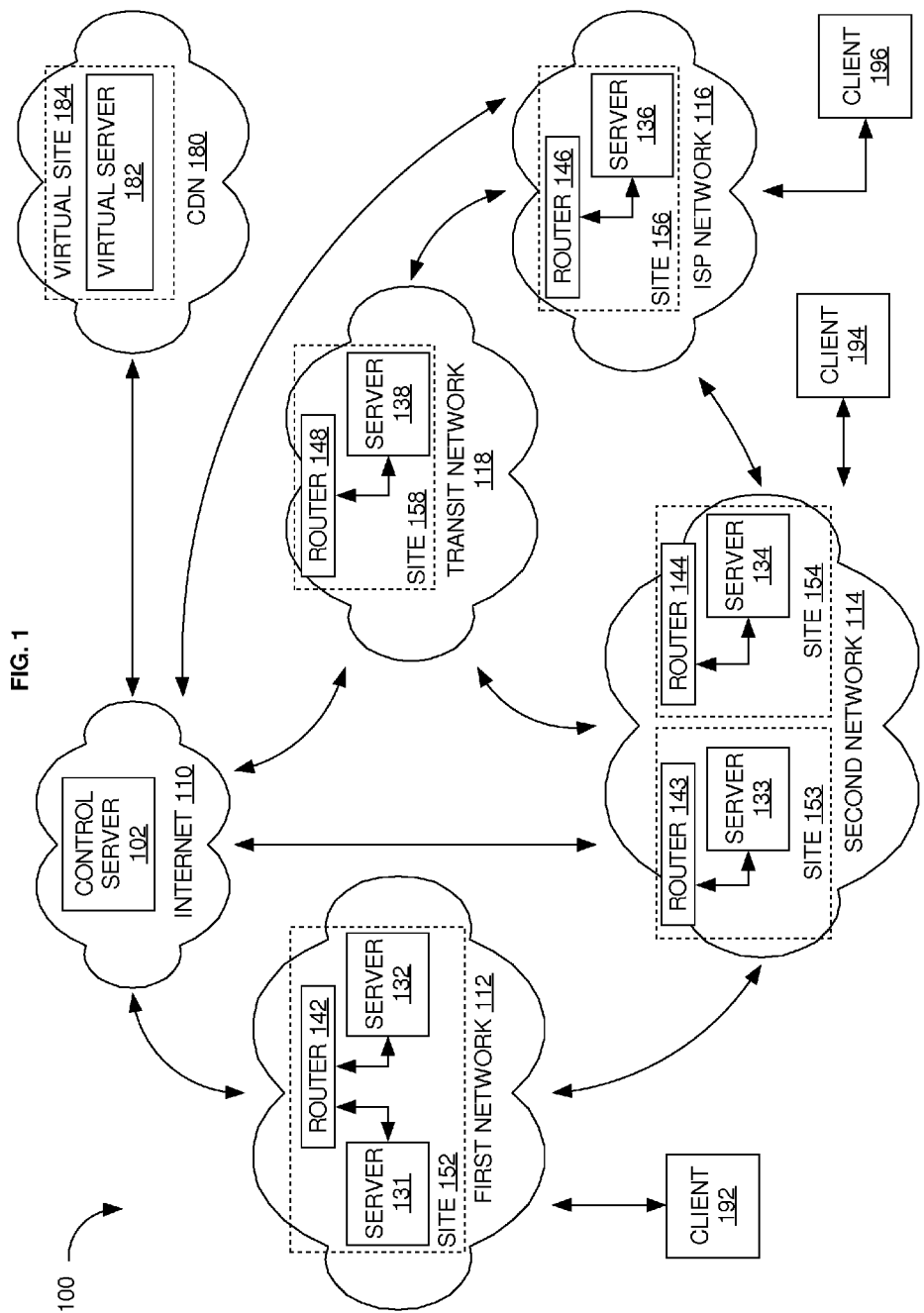
FIG. 1 illustrates a system comprising a control server computer, content server computers, and client computers distributed across a plurality of interconnected networks, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Network Topology
   2.1 Control Server Computer
   2.2 Sites
   2.3 Content Server Computers
   2.4 Client Computers
3.0 Process Overview
4.0 Control Server Computer Components and Processes
   4.1 Content Server Database
   4.2 Routing Table Repository
   4.3 Closeness Estimation Unit
      4.3.1 Prefixes and CIDR Block Notation
      4.3.2 AS-Path Attribute
      4.3.3 Multi-Exit Discriminator Attribute
      4.3.4 Geolocation Attribute
      4.3.5 Using Community Attributes
      4.3.6 Determining Closeness for Content Distribution Networks
   4.4 Grouping Content Server Computers Based On Cost
      4.4.1 Levels
      4.4.2 Level Assignment Unit
   4.5 Load Balancing
   4.6 Fault Tolerance and Configurations
   4.7 Estimating Closeness Independently for Multiple Files for the Same Title
5.0 Implementation Mechanisms—Hardware Overview
6.0 Other Aspects of Disclosure
1.0 General Overview Estimating the closeness of content server computers to client computers is described. In an embodiment, a method comprises receiving a first routing table of a first server computer; receiving a second routing table of a second server computer; receiving a request, from a client computer, for information about content servers that hold a media item title, wherein the request includes a client internet protocol address of the client computer; estimating that the first server computer is closer to the client computer than the second server computer is to the client computer based, at least in part, on the client internet protocol address, the first routing table, and the second routing table; sending, to the client computer, a first address to the client computer based, at least in part, on estimating that the first server computer is closer to the client computer than the second server computer, wherein the first address identifies the media item title stored on the first server computer. In an embodiment, the estimating comprises estimating that the first server computer is closer in physical location to the client computer than the second server computer is to the client computer.

In an embodiment, the method comprises receiving a third routing table of a third server computer; estimating that the first server computer is as close to the client computer as the third server computer is to the client computer based, at least in part, on the client internet protocol address, the first routing table, and the third routing table; sending a second address to the client computer based, at least in part, on estimating that the first server computer is as close to the client computer than the third server computer is to the client computer; wherein the second address identifies the media item title stored on the third server computer.

In an embodiment, the client computer is a first client computer, the request is a first request, the client internet protocol address is a first client internet protocol address; the method further comprises receiving a second request, from a second client computer, for information about content servers that hold the media item title, wherein the second request includes a second client internet protocol address of the second client computer; estimating that the second server computer is closer to the second client computer than the first server computer is to the second client computer based, at least in part, on the second client internet protocol address, the first routing table, and the second routing table; sending, to the second client computer, a second address to the second client computer based, at least in part, on estimating that the second server computer is closer to the second client computer than the first server computer is to the second client computer, wherein the second address identifies the media item title stored on the second server computer.

In other embodiments, the invention encompasses a computer apparatus and a computer-readable medium configured to carry out the foregoing steps.

2.0 Network Topology

A user, through a client computer, may select a media item (such as a movie, audio book, image, music, or any portion thereof) to watch and/or listen to on the user's client computer. The client computer may request and download the media item from content server computers distributed across one or more interconnected networks. The throughput and latency a client computer observes between the client computer and a content server computer are based on many factors, such as the number of networks traversed, the bandwidth of any of the networks traversed, the network congestion of any networks traversed, and the distance between the client computer and the content server computer. Accordingly, a client computer may increase the observed throughput and decrease the observed latency by requesting and downloading the media item from the closest content server computer to the client computer. The closest content server computer may be closest in with respect to network topology and/or geographically.

FIG. 1 illustrates a data processing system comprising a control server computer, content server computers, and client computers distributed across a plurality of interconnected networks, in an example embodiment. While FIG. 1 illustrates a particular embodiment for purposes of illustrating a clear example, other embodiments may omit, add to, reorder, and/or modify any of the elements shown. In FIG. 1, system 100 includes a plurality of interconnected networks: Internet 110, first network 112, second network 114, internet service provider ("ISP") network 116, transit network 118, and content delivery network ("CDN") 180.

Each of the networks illustrated in FIG. 1 broadly includes a combination of one or more other networks. For example, while Internet 110 is illustrated as a single network, Internet 110 is comprised of many public and private interconnected networks and internetworks.

First network 112, second network 114 and ISP network 116 may be peering networks. A peering network is an interconnection of administratively separate networks for the purpose of exchanging traffic between each network. Typically, in peering network agreements neither party pays the other for the exchanged traffic. For example, a content provider that stores data on content server computer 133 and causes data to be sent from content server computer 133 to client computer 192, through second network 114 and first network 112, may incur little if any cost.

ISP network 116 may be a network maintained by an ISP. An ISP network may also be known as an embedded network. An ISP may wish to host content on its own network to provide frequently requested content more quickly to customers. For example, if a media item is frequently requested, such as a newly released movie, then an ISP may store a copy of the media item on a content server computer on the ISP network, e.g., content server computer 136. Accordingly, client computers, such as client computer 194 may receive content stored on content server computer 136 more quickly than, for example, content server computer 131 on first network 112. Typically, content providers, which are not the ISP that own the ISP network, but which store content on the ISP network, incur little if any cost.

Transit network 118 is a transit network, which allows network traffic to cross or "transit" between two networks. A transit network may be a peering network with respect to certain client computers and/or networks. For the purpose of illustrating clear examples, transit network 118 herein is a transit network for all client computers and/or networks illustrated in FIG. 1. For example, client computer 196, connected to ISP network 116, may request a media item stored on content server computer 138, located on transit network 118. Content server computer 138 may send the requested media item to client computer 196 through transit network 118 and ISP network 116. Transit network 118 administrators may charge the content provider(s) storing the media item on content server computer 138 for consuming bandwidth on transit network 118. In some cases, such as the previous example, the content provider(s) and the ISP for client computer 194 may split the cost.

CDN 180 is a content distribution network or content delivery network. Typically, a CDN is a large distributed system of server computers deployed in multiple data centers across a set of networks distributed across various locations. The goal of a CDN is to deliver high availability and high performance content to client computers. A CDN is typically paid by content providers such as media companies for delivering the content provider's content to end-users. A CDN may be more expensive to transfer data to client computers than a transit network.

2.1 Control Server Computer

System 100 includes control server computer 102, which is coupled to content server computer 131, content server computer 132, content server computer 133, content server computer 134, content server computer 136, content server computer 138, and virtual content server computer 182 (collectively referred to as "content server computers 130"). Control server computer 102 is also coupled to client computer 192, client computer 194, and client computer 196 (collectively referred to as "client computers 190"). Control server computer 102 is connected to content server computers 130 and client computers 190 through one or more networks: Internet 110, first network 112, second network 114, ISP network 116, transit network 118, and/or CDN 180. In some embodiments, a content server computer or client computer may be located within the same network as control server computer 102.

Control server computer 102 may receive, from one of the client computers 190, one or more requests for information about content server computers 130 that hold a particular media item title. In response, control server computer 102 may send, to the requesting client computer, information which comprises addresses of one or more closest-estimated content server computers that hold the particular media item title, and/or addresses of particular media items or files stored on the one or more closest-estimated content server computers. An address may be a Uniform Resource Locator ("URL") or any other string or data that identifies a particular server computer, or identifies a media item or file on one or more server computers. Control server computer 102 may group the addresses into one or more levels, order the addresses, and/or assign weights to each of the addresses. The components and processes of control server computer 102 are further discussed in other sections below.

2.2 Sites

A site comprises one or more content server computers. Content server computers in a site are connected to one or more networks through a router. For convenience of expression, a content server computer that is "behind" a particular router is coupled to other networks or devices through the particular router. Content server computers behind a router are considered to be in the same site, because the network topology between a client and any server behind the same router may be substantially similar.

In FIG. 1, system 100 includes site 152, site 153, site 154, site 156, site 158, and virtual site 184 (collectively referred to as "sites 150"). Site 152 includes content server computer 131 and content server computer 132, which are each connected to first network 112 through router 142. Site 153 includes content server computer 133, which is connected to second network 114 through router 143. Site 154 includes content server computer 134, which is connected to second network 114 through router 144. Site 156 includes content server computer 136, which is connected to second network 116 through router 146. Site 158 includes content server computer 138, which is connected to transit network 118 through router 148.

Data sent from any content server computers in the same site, that is, through the same router, to a particular client may traverse a substantially similar network path. For purposes of illustrating a clear example, assume that client computer 196 requests a first media item from content server computer 131, and that client computer 196 requests a second media item from content server computer 132. Content server computer 131 may send data from the first media item to client computer 196 through router 142, first network 112, second network 114, and ISP network 116. Similarly, content server computer 132 may send data from the second media item to client computer 196 through router 142, first network 112, second network 114, and ISP network 116. As illustrated in this example, because content server computer 131 and content server computer 132 are in site 152 (i.e., content server computer 131 and content server computer 132 are coupled to client computer 196 through router 142), the data from the first media item, and data from the second media item, takes a similar path.

Control server computer 102 may be configured based upon the principle that content server computers in the same site have similar throughput. If content server computers do not have similar throughput, an administrator may place differing content server computers behind different routers. Thus, content server computers with differing performance may be in different sites. For example, content server computer 131 may have a hardware configuration that is similar to content server computer 132. Accordingly, and as illustrated in FIG. 1, an administrator may configure content server computer 131 and content server computer 132 to be behind the same router 142 and thus be in the same site, site 152. In contrast, content server computer 133 may have a hardware configuration that differs from content server computer 134. For example, content server computer 133 may have a disk drive that retrieves data substantially slower than the solid state drive installed in content server computer 134. Accordingly, an administrator may configure content server computer 133 and content server computer 134 to be behind router 143 and router 144, respectively. Thus, content server computer 133 and content server computer 134 may be in different sites, such as site 153 and site 154, respectively.

Additionally or alternatively, sites may be logically partitioned. Control server computer 102 may store a mapping from each content server computer to a logical site. For purposes of illustrating a clear example, assume that router 143 and router 144 are the same router, and thus content server computer 133 and content server computer 134 are behind the same router. Also assume that content server computer 133 may have a hardware configuration that differs from content server computer 134, which causes content server computer 133 to have a lower throughput than content server computer 134. Control server computer 102 may store a mapping that assigns content server computer 133 to site 153 and content server computer 134 to site 154. Thus, all of the content server computers in each logical site may perform similarly.

Sites may be located near each other. For example, Even if content server computer 133 and content server computer 134 are physically located in the same room, content server computer 133 and content server computer 134 may be behind different routers and thus in different sites.

System 100 also includes virtual site 184, which includes virtual content server computer 182. A request for a media item on a CDN may be forwarded to any number of content server computers in any number of locations. Even though all the content server computers at a CDN may be geographically diverse, all the servers of the CDN may be expected to perform similarly for any given client. Accordingly, control server computer 102 may treat a CDN (for example, CDN 180) as if the CDN includes a single site (for example, virtual site 184), which comprises a single content server computer (for example, virtual content server computer 182).

2.3 Content Server Computers

Content server computers 130 store and serve media items. A media item contains encoded media content, which when read by a computer or software running on a computer, may be used to play at least a portion of a movie, television show, audio book, podcast, pictures, slides, or any other media content that may be presented or played for a user.

A set of media items may collectively contain an entire piece of encoded multimedia content, and each media item in the set of media items may contain a segment of the entire piece of encoded multimedia content. For example, a set of media items may collectively contain an encoded movie, and each media item in a set of media items may contain a two-second chunk of the digitally encoded movie.

Multiple sets of media items may represent the same movie at different quality levels. For example, a first set and a second set of media items may both contain a particular encoded movie. The first set of media items, however, may contain the particular encoded movie at a lower bitrate than the second set of media items. Additionally or alternatively, the first set of media items may be in a first format compatible with a first type of client computer, such as a browser running on a desktop computer; and the second set of media items may be in a second format compatible with a second type of client computer, such as an application running on a mobile device.

Media content typically requires a large amount of storage space. A library of media items may exceed a petabyte. Since the size of a media library may be so large, a single content server computer may contain a set of media items that comprise a fraction of the media titles in the library.

An entire library may be distributed across multiple content server computers. For example, each of the sites 150 may contain a copy of the entire library, distributed across the content server computers in the site. Additionally or alternatively, for redundancy, each site may store two or more copies of the entire library, and each site may distribute its copies of the library across the content server computers in the site. In an embodiment, two copies of the same media item may not be stored on the same content server computer.

Additionally or alternatively, each site may store at least a portion of the entire library, and each site may distribute its portion of the library across the content server computers in the site. Additionally or alternatively, media items may be prioritized based, at least in part, on popularity. More content server computers may store copies of higher priority media items than lower priority media items.

2.4 Client Computers

A client computer may be desktop computer, laptop, tablet, phone, other mobile device, game console, set-top box, streaming media player, disc player, television, hybrid television, or any other computing device capable of requesting, receiving, streaming, playing, and/or displaying media items from a content server computer. For example, in FIG. 1, client computer 192 may be a desktop computer, client computer 194 may be a gaming console, and client computer 196 may be a mobile phone or smartphone.

A client computer may include its own network, connected to another network through a router. For example, a client computer may be a set-top box coupled to a router, coupled to a cable modem, coupled to an ISP, and coupled to one or more other networks.

In FIG. 1, system 100 includes client computer 192, client computer 194, and client computer 196 (collectively referred to and "client computers 190"). Client computers 190 are coupled each server in system 100. For example, client computer 192 may be coupled with content server computer 131 and content server computer 132 through first network 112, and specifically through router 142. Client computer 192 may be coupled with content server computer 133 and content server computer 134 through first network 112 and second network 114, and specifically through router 143 and router 144, respectively. Client computer 192 may be coupled with content server computer 136 through first network 112, second network 114, and ISP network 116, and specifically through router 146. Client computer 192 may be coupled with content server computer 138 through first network 112, second network 114, and transit network 118, and specifically through router 148. Client computer 192 may be coupled with virtual content server computer 182 through first network 112, internet 110, and CDN 180. Client computer 192 may be coupled with control server computer 102 through first network 112 and internet 110.

3.0 Process Overview

Figure 3:
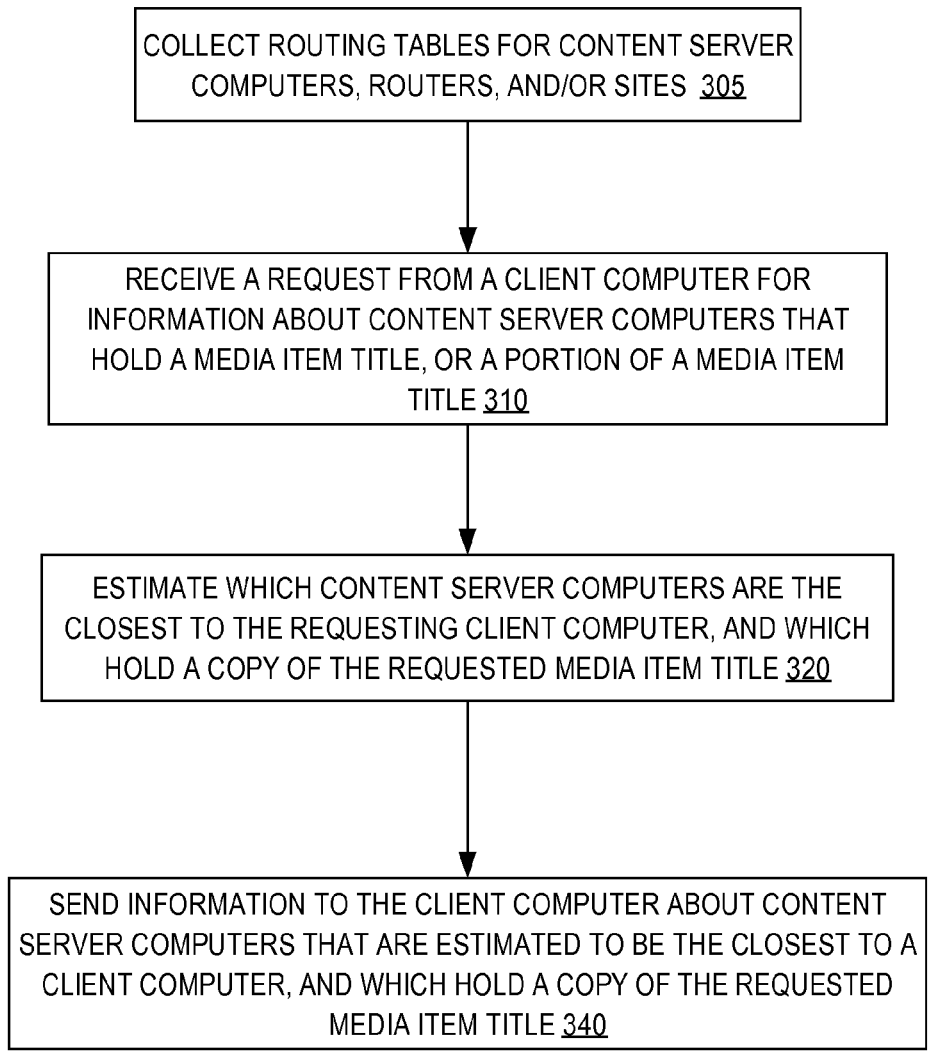
FIG. 3 illustrates a process of estimating and selecting the closest one or more content server computers in response to receiving a request for information about content server computers that hold a media item title, in an example embodiment.

FIG. 3 illustrates a process of estimating and selecting the closest one or more content server computers in response to receiving a request for information about content server computers that hold a media item title, in an example embodiment. While FIG. 3 illustrates example steps according to an embodiment, other embodiments may omit, add to, reorder, and/or modify any of the steps shown. For purposes of illustrating a clear example, FIG. 3 may be described with reference to FIG. 1, but using the particular arrangement illustrated in FIG. 1 is not required in other embodiments.

In FIG. 3, step 305, a control server computer such as control server computer 102 (FIG. 1) collects a plurality of routing tables. A routing table is a data table or collection of data stored on a router and/or a server computer that comprises information about the topology of the network(s) coupled to the router or server computer. A BGP routing table is a table or collection of data that comprises a list of routes with internet protocol ("IP") networks or "prefixes" which designate network reachability. Each of the routes stored in a BGP routing table may also include other attributes: AS-Path, MED, geolocation, and communities. Routes stored in BGP routing tables stored on a router and/or server computer are propagated to other routers and/or server computers to make other routers and/or server computers aware of new networks and/or new routes to networks.

Returning to step 305, in one embodiment, control server computer 102 collects routing tables for each of the content server computers 130, routers 140, and/or sites 150. For example, each of the content server computers 130 may maintain its own routing table or may download a routing table from the router it is behind. Each of the content server computers 130 may uploaded its routing table to control server computer 102. Control server computer 102 may store the received routing table in a routing table repository or database and associate the received routing table with the content server computer that uploaded the routing table. If a first routing table is identical to a second routing table in the routing table repository, control server computer 102 may delete the second routing table. Control server computer 102 may associate the content server computer associated with the second, deleted routing table, with the first routing table.

Additionally or alternatively, routers 140 and/or sites 150 may be associated with routing tables. For example, each of routers 140 may upload a routing table to control server computer 102. Control server computer 102 may store the uploaded routing table in a routing table repository and associate the routing table with the router, the site the router belongs to, and/or each content server computer behind the router. Control server computer 102 may include mappings of routers and sites, sites and content server computers, and/or routers and content server computers.

In step 310, control server computer 102 receives a request from a client computer for information about content server computers that hold a media item title, or a portion of a media item title. For example, a user interacting with client computer 192 may select, through a graphical user interface a particular movie, "movie XYZ," to watch on client computer 192. In response, client computer 192 may send a request to control server computer 102 for information about content server computers that hold a copy of movie XYZ. Control server computer 102 receives the request and proceeds to step 320.

In Step 320, control server computer 102 estimates which content server computers are the closest to the requesting client computer, and which hold a copy of the requested media item title. For example, control server computer 102 may maintain a database that keeps a record of which movies, or portions of movies, are stored on each of content server computers 130. Continuing with the example in step 310 and for purposes of illustrating a clear example, assume that movie XYZ is stored on content server computer 131, content server computer 136, content server computer 138, and virtual content server computer 182. Control server computer 102 may estimate which content server computers are the closest based, at least in part, on the routing tables associated with each of content server computers 131, 136, 138, 182. A process of using routing tables to estimate closeness is discussed in later sections. In this example, control server computer 102 may estimate that content server computer 131, content server computer 136, and virtual content server computer 182 are the closest.

In step 340, control server computer 102 sends information to the client computer about content server computers that are estimated to be the closest to client computer 350, and which hold a copy of the requested media item title. Continuing with the example in step 320, control server computer 102 may send to client computer 192 a set of uniform resource locators ("URLs") identifying network locations of content server computer 131, content server computer 136, and content server computer 182.

4.0 Control Server Computer Components and Processes

Control server computer 102 may estimate the closest content server computers that hold a media item title for each of client computers 190. Additionally, control server computer 102 may group content server computers into levels based on cost, and/or weight content server computers based, at least in part, on capacity, bandwidth, or any other performance metric. The results may be returned to the requesting client computer.

Figure 2:
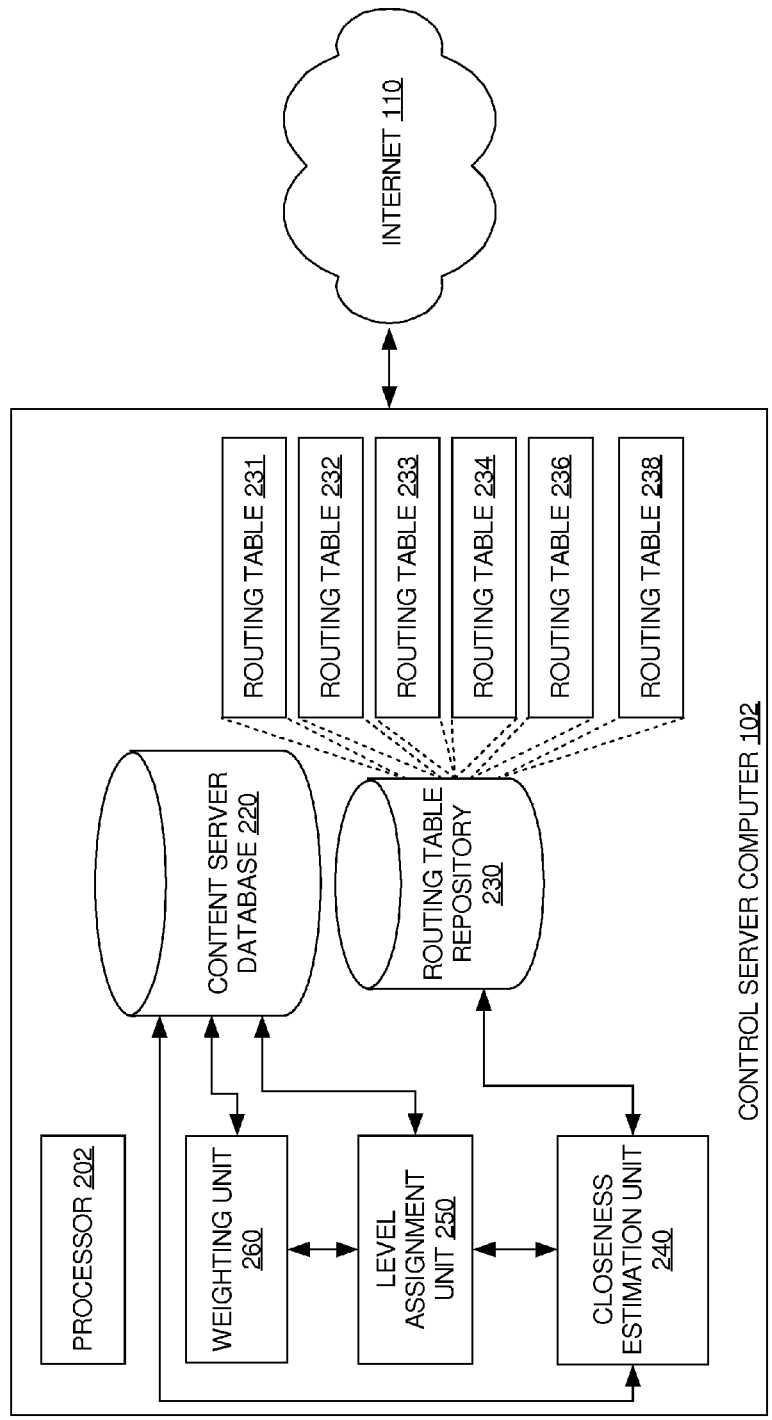
FIG. 2 illustrates a control server computer, in an example embodiment.

FIG. 2 illustrates a control server computer, in an example embodiment. While FIG. 2 illustrates a particular embodiment for purposes of illustrating a clear example, other embodiments may omit, add to, reorder, and/or modify any of the elements shown. In FIG. 2, control server computer 102 is illustrated as if all components are implemented on a single computer; however, the control server computer may be implemented using multiple computers, such as a database server, a file server, and server computers performing closeness estimation, grouping, and/or or weighting. For purposes of illustrating a clear example, FIG. 2 may be described with reference to FIG. 1, but using the particular arrangement of FIG. 1 is not required in other embodiments.

In FIG. 2, control server computer 102 comprises processor 202, content server database 220, routing table repository 230, closeness estimation unit 240, level assignment unit 250, and weighting unit 260. The processor 202 may comprise a CPU that is configured to execute stored programs to perform the processes and operations described further herein for control server computer 102, or any of its components.

4.1 Content Server Database

Content server database 220 includes a list of available media items stored on each of the content server computers 130. Content server database 220 may also include the addresses of each of the content server computers 130. For example, content server database 220 may include a list of all media items stored on content server computer 131. Content server database 220 may also include uniform resource locators ("URLs") for content server computer 131 and/or for the media items stored on content server computer 131.

Content server database 220 may include the estimated throughput for each of the sites 150 and/or content server computers 130. The estimated throughput may be based on the bandwidth available, the speed of each of content server computers 130, and other factors. For example, content server database 220 may store the estimated bandwidth of content server computer 131, for example, one gigabit per second, and the estimated bandwidth of content server computer 133 (for example, two gigabits per second). Also for example, content server database 220 may store the estimated bandwidth of site 156, which may be four gigabits per second, and the estimated bandwidth of virtual site 184 (for example, six gigabits per second).

Additionally or alternatively, content server database 220 may include the relative throughput for each of the sites 150 and/or content server computers 130. For example, content server database 220 may store the relative throughput of content server computer 131 compared to content server computer 133 (for example, 0.5 or 50%, indicating that content server computer 131 has half the bandwidth of content server computer 133). Similarly, content server database 220 may store the relative throughput of site 156 compared to virtual site 184 (for example, 0.66 or 66%, indicating that the bandwidth of site 156 is two-thirds the bandwidth of virtual site 184).

Content server database 220 may also include a cost, an estimated cost, and/or a cost indicator for sending data form one or more of the content server computers 130 and/or sites 150. For example, content server database 220 may store the cost of $1.00 per gigabyte transferred from virtual content server computer 182 or virtual site 184. Also for example, content server database 220 may store data that indicates that transferring data to client computer 192 from content server computer 138, which is located on transit network 118, may be more expensive than from content server computer 133, which is located on second network 114 (a peering network).

4.2 Routing Table Repository

Routing table repository 230 may include routing tables received by control server computer 102 for each of content server computers 130, each of routers 140, and/or each of sites 150. In FIG. 2, routing table repository 230 includes a routing table that corresponds to each of content server computers 130: routing table 231 corresponds to content server computer 131, routing table 232 corresponds to content server computer 132, routing table 233 corresponds to content server computer 133, routing table 234 corresponds to content server computer 134, routing table 236 corresponds to content server computer 136, and routing table 238 corresponds to content server computer 138.

Routing tables may not be available for CDNs, such as CDN 180, and/or virtual content server computers, such as virtual content server computer 182. For example, some CDNs may not distribute routing tables to content providers. Thus in an embodiment, a CDN may be generally estimated. For example, content server computer 102 may estimate that virtual content server computer 182 is one of the closest content server computers to any, or a subset of, client computers 190 based, at least in part, on client computer type, client computer location, or any other attributes associated with a client computer. Additionally or alternatively, routing table repository 230 may include a routing table that corresponds to virtual content server computer 182. The routing table that corresponds to virtual content server computer 182 may be configured, at least in part, by a network administrator.

4.3 Closeness Estimation Unit

Closeness estimation unit 240 may use the routing tables stored in the routing table repository 230 to estimate which content server computers 130, routers 140, and/or sites 150 are closest to a particular client computer. Specifically, closeness estimation unit 240 may query content server database 220 for content server computers that hold media items which include at least portion of a selected media title. Closeness estimation unit 240 may query the routing table repository for the routing tables that correspond with the returned content server computers. Closeness estimation unit 240 may estimate based, at least in part, on the returned routing tables which of the returned content server computer(s) are closest to the particular, requesting client computer.

Figure 4:
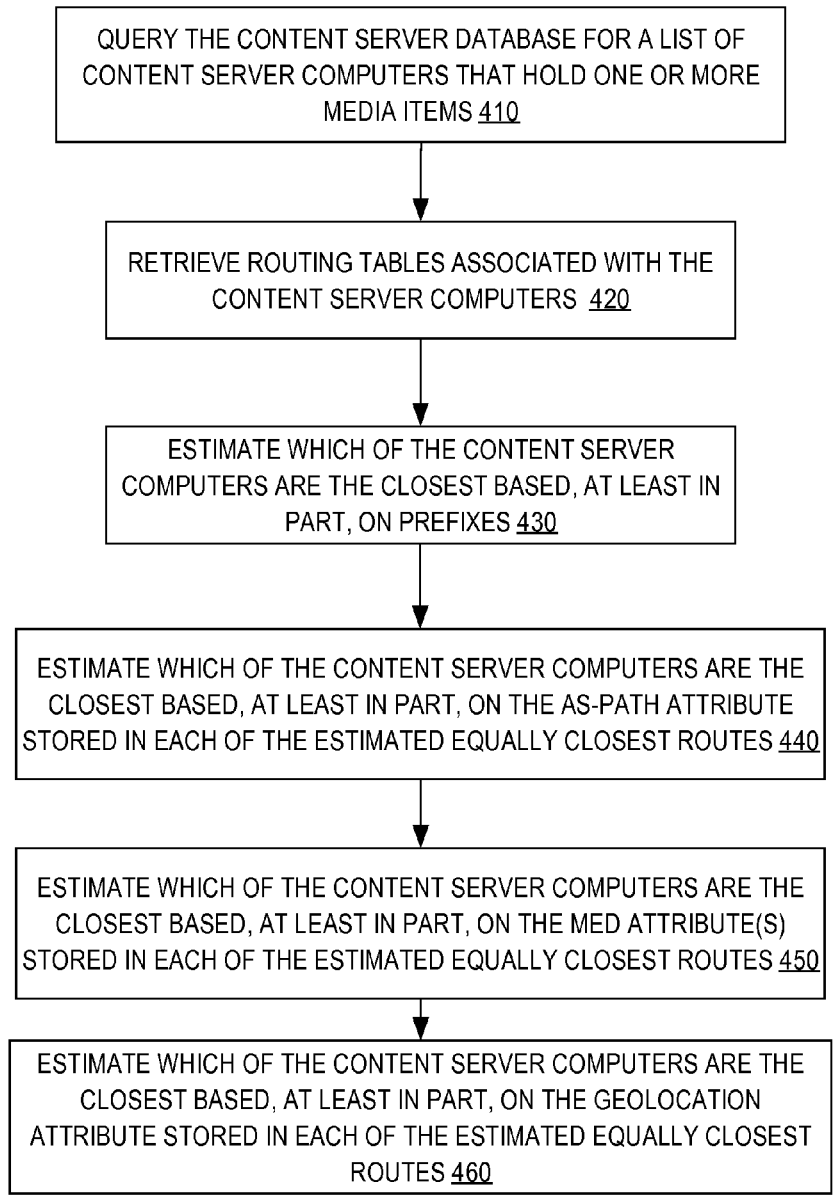
FIG. 4 illustrates a process of estimating which content server computers, which hold a copy of a requested media item, are the closest to a client computer, according to an example embodiment.

FIG. 4 illustrates a more detailed process for estimating which content server computers, which hold a copy of a requested media item, are the closest to a client computer, according to an example embodiment. While FIG. 4 illustrates example steps according to an embodiment, other embodiments may omit, add to, reorder, and/or modify any of the steps shown. For purposes of illustrating a clear example, FIG. 4 may be described using the embodiments illustrated in FIG. 1 and FIG. 2.

Referring now to FIG. 4, in step 410, closeness estimation unit 240 queries content server database 220 for a list of content server computers that hold one or more media items. For example, closeness estimation unit 240 queries content server database 220 for all content server computers that hold a media item that is an encoded copy of movie XYZ, or a portion of an encoded copy of movie XYZ. For purposes of illustrating a clear example, assume content server computer 131, content server computer 132, content server computer 133, content server computer 136, and content server computer 138 hold a media item that is an encoded copy of movie XYZ, or a portion of an encoded copy of movie XYZ. Accordingly, in response to the query from closeness estimation unit 240, content server database 220 returns a list of content server computers that satisfy the query: content server computer 131, content server computer 132, content server computer 133, content server computer 136, and content server computer 138.

In step 420, closeness estimation unit 240 retrieves routing tables associated with the content server computers returned in step 410. Continuing with the example in step 410, closeness estimation unit 240 retrieves the corresponding routing tables from routing table repository 230: routing table 231, routing table 232, routing table 233, routing table 236, and routing table 318.

In steps 430, 440, 450, 460, closeness estimation unit 240 estimates the closest content server computers to a particular client computer based, at least in part, on the retrieved routing tables. Closeness estimation unit 240 may use one or more route attributes of the routing tables to estimate which content server computers are closest to a particular client computer.

4.3.1 Prefixes and CIDR Block Notation

Closeness estimation unit 240 may estimate which of the content server computers 130 are the closest based, at least in part, on the prefixes stored in each of the retrieved routing tables and the requesting client computer's IP address. Prefixes in a routing table indicate reachability of a particular IP address or subnet. Typically, prefixes are stored as Classless Inter-Domain Routing ("CIDR") blocks. CIDR block notation may vary widely. For the purpose of illustrating clear examples, this disclosure uses Net CIDR block notation. However, other embodiments may use other formats or notations. In Net CIDR block notation, CIDR blocks comprise two components: an IP address and a number trailing a slash called the prefix size, for example, 255.255.255.0/24. The IP address may be stored as a series of thirty-two bits, of which eight bits are allocated for each subnet; thus, each subnet may range from zero to 255. The prefix size indicates the number of "1" bits in a thirty-two bit-wide mask called a prefix mask, which is applied to the IP address to determine a range.

The following three examples illustrate how CIDR block notation is used to specify a range of one or more subnets or addresses: In the first example, 192.168.100.0/22 represents 1024 subnets ranging from 192.168.100.0 to 192.168.103.255. In the second example, 192.168.111.0/24 represents 256 subnets ranging from 192.168.111.0 to 192.168.111.255. In the third example, 192.168.111.031/32 represents one subnet or address: 192.168.111.031. As illustrated in the three examples, the larger the prefix size, the narrower the range of subnets or addresses is.

Returning now to FIG. 4, in step 430, closeness estimation unit 240 estimates which of the content server computers are closest based, at least in part, on prefixes, which may be stored as CIDR blocks. For the purpose of illustrating a clear example, assume client computer 194 has an IP address: 38.104.134.186. Also assume that a first route is stored in routing table 231, a second route is stored in routing table 233, a third route is stored in routing table 234, a fourth route is stored in routing table 236, and a fifth route is stored in routing table 238. Further assume that the first route, second route, third route, and fourth route each includes a prefix: 38.104.134.186/32; and the fifth route includes a prefix: 38.104.134.0/24. The IP address of client computer 194 is within the range of each prefix. The first four routes are estimated to be closer than the fifth route because the first four routes have a narrower range than the fifth route. Accordingly, closeness estimation unit 240 estimates that content server computers 131, 133, 134, and 136 are equally closer to client computer 194 than content server computer 138.

Additionally or alternatively, prefixes with substantially overlapping ranges may be considered equally distant. For example, closeness estimation unit 240 may estimate that two prefixes, 38.104.134.184/30 and 38.104.134.186/31, are equally close to a client computer with an IP address 38.104.134.186.

4.3.2 AS-Path Attribute

Closeness estimation unit 240 may estimate which of the content server computers are the closest based, at least in part, on the AS-Path attribute. The AS-Path attribute may include AS numbers, which indicate the network(s) that data may traverse to reach the intended network or address. Each of routers 140 may include a unique AS number. For the purpose of illustrating clear examples, assume that the reference numeral used in FIG. 1 for each of the routers 140 is the AS number of the router; thus, the AS number for router 143 is 143, and the AS number for router 142 is 142, and so on. Further assume that the AS number of each of content server computers 130 is the AS number of the router the content server computer is behind. Accordingly, the AS number for content server computer 133, which is behind router 143, is 143, and the AS number for both content server computer 131 and content server computer 132 is 142.

When a local route is inserted into a routing table the AS-Path attribute may be empty. For example, the routing table 233, which corresponds to content server computer 133, router 143, or site 153 may include a route with a prefix that includes the IP address of client computer 194. The route's AS-Path attribute may be empty, because client computer 194 is local to content server computer 133, router 143, and/or site 153.

When a route is propagated to other routers, the current router's AS number may be appended to the AS-Path attribute. For purposes of illustrating clear example, assume router 143 propagates the route in the previous example to router 146. Router 146 may store a copy of the received route, but the AS-Path attribute may be set to "143". Accordingly, the AS-Path may indicate that data sent between router 146 and client computer 143 passes through router 143. Also for example, assume router 146 propagates its new route to router 148. The routing table at router 148 may include a new route that has the same prefix as the original route stored at router 143, but the AS-Path attribute may be set to "148 143". The AS-Path indicates to router 148 that data sent between content server computer 133 and router 146 passes through router 146 and router 143.

Returning to FIG. 4, in step 440, and as illustrated above, closeness estimation unit 240 estimates which of the content server computers are the closest based, at least in part, on the AS-Path attribute stored in each of the estimated equally closest routes. Specifically, closeness estimation unit 240 may estimate that routes which include a shorter AS-Path may be closer to the requesting client computer. For purposes of illustrating a clear example, assume the that the closeness estimation unit 240 estimates that the first four routes, of the five routes discussed in the previous section, which are stored in routing tables 231, 233, 234, and 236, are equally the closest to client computer 194 based on the prefixes stored in each of the five routes. Further assume that the first route includes an AS-Path: 143; the second route and third route include an empty AS-Path; and the fourth route includes an AS-Path: 143. Closeness estimation unit 240 may estimate that content server computer 133 and content server computer 134 are closer to client computer 194 than content server computer 131 and content server computer 136 based, at least in part, on the number of AS numbers stored in each route's AS-Path. Furthermore, closeness estimation unit 240 may estimate that content server computer 133 and content server computer 134 are equally close to client computer 194.

4.3.3 Multi-Exit Discriminator Attribute

Closeness estimation unit 240 may estimate which of the content server computers are the closest based, at least in part, on a multi-exit discriminator ("MED") attribute stored in each route. The MED attribute indicates the preferred path into a network that has multiple entry points. Typically, a lower MED value is assumed to be preferred over a higher MED value. However, in other embodiments a higher MED value is assumed to be preferred over a lower MED value.

A network administrator may set the MED value to indicate a preference. For purposes of illustrating a clear example, assume content server computer 138 resides on transit network 118, which may charge a content provider hosting content on content server computer 138 to transmit data to other networks. Also assume that content server computer 131 resides on first network 112 (a peering network), which may not charge a content provider hosting content on content server computer 138 to transmit data to other networks. Accordingly, a network administrator for content server computer 138 may set the MED attribute to a higher value for all routes in routing table 238, which corresponds to content server computer 138. The higher MED value may indicate that other content server computers may be less preferable over other content server computers, such as content server computer 131. A network administrator may increase the MED value for many other reasons. For example, a particular a particular subnet is known to have a higher latency on average than another subnet; accordingly each of the routes to the particular subnet are assigned a higher MED value by a network administrator. MED values may also be based on a client computer's or subnet's location (for example, country), device type (for example, gaming consoles), a testing plan, and/or ISP. Accordingly, closeness estimation unit 240 may estimate some routes as less preferable based on an MED attribute and a client computer's location, device type, testing plan, and/or ISP.

Returning now to FIG. 4, in step 450, closeness estimation unit 240 estimates which of the content server computers are the closest based, at least in part, on the MED attribute(s) stored in each of the estimated equally closest routes. Specifically, closeness estimation unit 240 may estimate that routes which include a lower MED may be closer to the requesting client computer. For purposes of illustrating a clear example, assume the that the closeness estimation unit 240 estimates that the second route and the third route, of the five routes discussed in the previous section, which are stored in routing table 233 and routing table 234, respectively, are equally the closest to client computer 194 based on the prefixes and AS-Paths stored in each of the two routes. Further assume that the second route includes an MED value: 1; and the third route includes an MED value: 10. Closeness estimation unit 240 may estimate that content server computer 133 is closer to client computer 194 than content server computer 134 based, at least in part, on the MED value stored in each route's MED attribute.

In an embodiment, if a route does not contain an MED value, the closeness estimation unit 240 may assume the route has the maximum MED value possible, which indicates that the route is the worst possible route for all routes that have attributes that match the other attributes in the route. In another embodiment, if a route does not contain an MED value, the closeness estimation unit 240 may assume the route has the minimum MED value possible, which indicates that the route is the best possible route for all routes that have attributes that match the other attributes in the route.

4.3.4 Geolocation Attribute

Closeness estimation unit 240 may estimate which of the content server computers are the closest based, at least in part, on a geolocation attribute stored in each route. The geolocation attribute may declare the location of a routes subnet or prefix. For example, the geolocation attribute in a route may comprise the approximate longitude and the latitude of the route prefix. Additionally or alternatively, the geolocation attribute may comprise the street address of the route prefix. Additionally or alternatively, the geolocation attribute may comprise other geolocation metrics.

A network administrator may set the geolocation attribute to indicate where subnet is located. For example, a network administrator for content server computer 131 may set all local routes in routing table 231 to a street address of content server computer 131 to indicate the geolocation of local routes or subnets. A network administrator may set a geolocation attribute for many other reasons, including: a particular content server computer has a particularly high throughput for a particular set of subnets all of which are located in a particular area; or a particular content server computer is meant to be dedicated, or at least intended primarily for, sending or streaming data to a particular region.

Returning now to FIG. 4, in step 460, closeness estimation unit 240 estimates which of the content server computers are the closest based, at least in part, on the geolocation attribute stored in each of the estimated equally closest routes. For purposes of illustrating a clear example, assume the that the closeness estimation unit 240 estimates that the second route and the third route, of the five routes discussed in the previous sections, which are stored in routing table 233 and routing table 234, respectively, are equally the closest to client computer 194 based on the prefixes and AS-Paths stored in each of the two routes. Further assume that content server computer 133 is located on the West side of a particular street in London, England, and that content server computer 134 is located on the East side of the same particular street in London. Further assume the second route and the third route include a geolocation value that identifies the prefix of the second route and the third route is west of London. Closeness estimation unit 240 may estimate that content server computer 133 is closer to client computer 194 than content server computer 134 based, at least in part, on the geolocation value stored in each route's geolocation attribute.

In an embodiment, if a route does not contain a geolocation attribute, the closeness estimation unit 240 may assume the route has the worst possible geolocation value, which indicates that the route is the furthest possible route for all routes that have attributes that match the other attributes in the route. In another embodiment, if a route does not contain a geolocation attribute, the closeness estimation unit 240 may assume the route has the best possible geolocation value, which indicates that the route is the closest possible route for all routes that have attributes that match the other attributes in the route.

4.3.5 Using Community Attributes

A community attribute may be an attribute added to each route or prefix to modify how that route is compared to other routes. Another name for a community attribute may be a "routing property" or "routing attribute". Typically the community attribute is stored as a number in each route, but may be a string or any other data type. The value may be any value defined by a network administrator. For purposes of illustrating a clear example, particular community attributes may be described with reference to particular values, but using the particular values are not required in other embodiments. In an embodiment, a community attribute set to a first value (e.g., "1"), may indicate that the geolocation value should be treated as if the geolocation value is the best possible geolocation value. A community attribute set to a second value (e.g., "2"), may indicate that the MED value should be treated as if the MED value is as good as any observed or compared MED value. A community attribute set to a third value (e.g., "3"), may indicate that both the MED attribute and the geolocation attribute should be treated as if both the MED attribute and the geolocation attribute are the best possible MED value and geolocation value, respectively. Community attributes may indicate to closeness estimation unit 240 to ignore one or more attributes, assign the worst possible value(s) to one or more attributes, assign the best possible value(s) to one or more attributes, or estimate the closeness of one or more routes, or route attributes, differently.

Returning now to FIG. 4, in each of steps 430 through 460, closeness estimation unit 240 may estimate each route different based, at least in part, on the community attribute(s) stored in each of the closest routes. For purposes of illustrating a clear example, assume the that the closeness estimation unit 240 estimates that the second route and the third route, of the five routes discussed in the previous sections, which are stored in routing table 233 and routing table 234, respectively, are equally the closest to client computer 194 based on the prefixes and AS-Paths stored in each of the two routes. Assume that the second route has an MED value of "1" and the third route has an MED value of "10." Assume that content server computer 133 is located on the West side of a particular street in London, England, and that content server computer 134 is located on the East side of the same particular street in London. Assume the second route and the third route include a geolocation value that identifies the prefix of the second route and the third route is west of London. Further assume, that the community attribute assigned to the second route and the third route indicate that closeness estimation unit 240 should ignore the MED attribute and geolocation attribute of the second route and the third route. Accordingly, closeness estimation unit 240 may estimate that content server computer 133 and content server computer 134 are equally close to client computer 194, even though either content server computer 133 or content server computer 133, would have normally been estimated to be closer to client computer 194 than the other.

4.3.6 Determining Closeness for Content Distribution Networks

As discussed above, CDN 180 and virtual content server computer 182 may be a large distributed systems of server computers deployed in multiple data centers across a set of networks distributed across various locations. Accordingly, closeness estimation unit 240 may assume that virtual content server computer 182, within CDN 180 is equally close to client computers 190 as any other content server computer on any other network. If there is a routing table available for virtual content server computer 182, then the virtual table may be included in routing table repository 230 and included in the processes discussed above.

4.4 Grouping Content Server Computers Based on Cost

For a particular client computer some of the estimated closest content server computers are less expensive that other content server computers for content providers to send data to. Accordingly, control server computer 102 may group one or more of the estimated closest content server computers into levels based, at least in part, on cost.

4.4.1 Levels

A level may be a group of one or more content server computers that are estimated to cost the content provider the same, or nearly the same, amount. For the purpose of illustrating a clear example, assume that first network 112 and second network 114 are peering networks, at least with each other and client computer 192 and client computer 194. As discussed above, peering networks typically do not charge content providers for sending data between the two peering networks or client computers connected to the peering networks. Accordingly, for client computer 192 or client computer 194, control server computer 102 may group content server computers on either first network 112 and second network 114 into the same level, because the cost is estimated to transfer data from either network to client computer 192 or client computer 194 be the same (e.g., free).

A higher level may indicate a higher cost. For example, CDN 180 is a CDN which charges content providers for distributing data. Similarly, transit network 118 is a transit network, which charges content providers for distributing data. For the purpose of illustrating a clear example, assume that the CDN 180 administrator(s) and transit network 118 administrator(s) charge the content provider the same amount per gigabyte transferred outside of either transit network 118 or CDN 180, respectively. Accordingly, for client computer 192 or client computer 194, control server computer 102 may group content server computers on transit network 118 and CDN 180 into the same level, because the cost is estimated to be approximately the same (for example, not free). Furthermore, control server computer 102 may assign content server computers on either transit network 118 or CDN 180 to a higher level than the level assigned to content server computers on either first network 112 or second network 114, because the higher level costs the content provider more.

Control server computer 102 may assign content control computers to any number of levels. For purpose of illustrating clear example, assume that the estimated cost to transfer data from virtual content server computer 182 is greater than from content server computer 138. Further assume the cost to transfer data from content server computer 131 and content server computer 133 is less than either virtual content server computer 182 or content server computer 138. Accordingly, control server computer 102 may assign content server computer 131 and content server computer 133 to a first level. Control server computer 102 may assign content server computer 133 to a second level. And, control server computer 102 may assign virtual content server computer 182 to a third level.

4.4.2 Level Assignment Unit

Control server computer 102 may associate the closest content server computers for a particular client computer using level assignment unit 250. Level assignment unit 250 is coupled to closeness estimation unit 240 and content server database 220. Level assignment unit 250 may receive the estimated closest content server computers for a particular client computer from closeness estimation unit 240. Level assignment unit 250 may use the data stored in content server database 220 to estimate a cost or a relative cost of serving a media item from each of the estimated closest content server computers.

Figure 5:
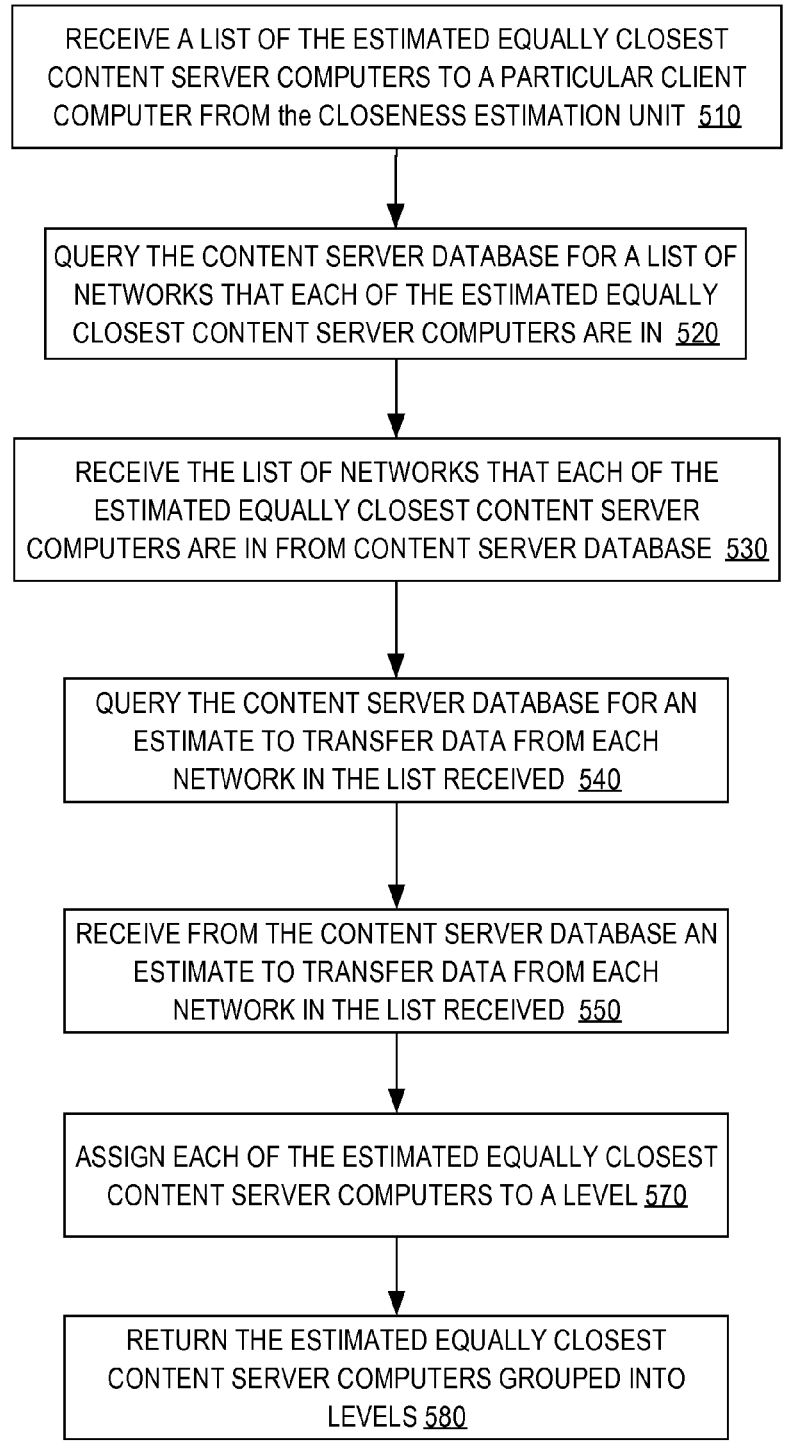
FIG. 5 illustrates a process for assigning the estimated closest content server computers to levels for a particular client computer, in an example embodiment.

FIG. 5 illustrates a process for assigning the estimated closest content server computers to levels for a particular client computer, in an example embodiment. While FIG. 5 illustrates example steps according to an embodiment, other embodiments may omit, add to, reorder, and/or modify any of the steps shown. For purposes of illustrating a clear example, FIG. 5 may be described using the embodiments illustrated in FIG. 1 and FIG. 2. For purposes of illustrating a clear example, assume that content server database 220 associates each of content server computers 130 with the network the content server computer is located on. Assume that content server database 220 includes a price per gigabyte to transfer data from each network to a client computer on a different network. Furthermore, assume that according to the content server database 220, the cost to transfer data from CDN 180 is the most expensive, the cost to transfer data from transit network 118 is slightly less expensive, and the cost to transfer data from any other networks is minimal.

Referring now to FIG. 5, in step 510, level assignment unit 250 receives a list of the estimated equally closest content server computers to a particular client computer from closeness estimation unit 240. For example, level assignment unit 250 may receive a list of the estimated equally closest content server computers to client computer 192 that also holds media item that is a copy of movie XYZ. The list may include content server computer 133, content server computer 136, content server computer 138, and virtual content server computer 182.

In step 520, level assignment unit 250 queries content server database 220 for a list of networks that each of the estimated equally closest content server computers are in. Continuing with current example in step 510, level assignment unit 250 may query content server database 220 for the networks that content server computer 133, content server computer 136, content server computer 138, and virtual content server computer 182 are in.

In step 530, level assignment unit 250 receives the list of networks that each of the estimated equally closest content server computers are in from content server database 220. Continuing with the current example in step 520, the list of networks includes second network 114, ISP network 116, transit network 118, and CDN 180.

In step 540, level assignment unit 250 queries content server database 220 for an estimate to transfer data from each network in the list received in step 530. Continuing with the example in step 530, level assignment unit 250 may query content server database 220 for the price per gigabyte to transfer data from second network 114, ISP network 116, transit network 118, and CDN 180 to a client computer 192, which is connected to each of the content server computers 130 through first network 112.

Additionally or alternatively, level assignment unit 250 may query content server database 220 for the relative indicator of the cost to transfer data from each network in the list received in step 530. For example, content server database 220 may store a relative cost indicator for each network compared to each of the other networks. Level assignment unit 250 may query content server database 220 for the relative indicators for each of the networks in the list of networks received in step 530.

In step 550, level assignment unit 250 receives from content server database 220 an estimate to transfer data from each network in the list received in step 530. Continuing with the example in step 540, level assignment unit 250 may receive prices from content server database 220: the price per gigabyte to transfer data from second network 114 and ISP network 116 is free; the price per gigabyte to transfer data from transit network 118 is $1.00; and the price per gigabyte to transfer data from CDN is $2.00.

Additionally or alternatively, level assignment unit 250 may receive relative cost indicators from content server database 220 for each of the queried for networks: CDN 180 costs more to transfer data than second network 114, ISP network 116, or transit network 118; transit network 118 costs more to transfer data than second network 114 or ISP network 116; and second network 114 costs about the same to transfer data as ISP network 116.

In step 560, level assignment unit 250 associates the prices to each of the estimated equally closest content server computers. Continuing with the example in step 550, level assignment unit 250 associates the price of second network 114 to content server computer 133, the price of ISP network 116 to content server computer 136, the price of transit network 118 to content server computer 138, and the price of CDN 180 to virtual content server computer 182.

Additionally or alternatively, level assignment unit 250 associates the relative cost indicator of second network 114 to content server computer 133, the relative cost indicator of ISP network 116 to content server computer 136, the relative cost indicator of transit network 118 to content server computer 138, and the relative cost indicator of CDN 180 to virtual content server computer 182.

In step 570, level assignment unit 250 assigns each of the estimated equally closest content server computers to a level. Continuing with the example in step 560, level assignment unit 250 assigns content server computer 133 and content server computer 136 to a first level, because the price of each server is the same, and the price of each server is lower than either content server computer 138 or virtual content server computer 182. Level assignment unit 250 assigns content server computer 138 to a second level, because the price of content server computer 138 is more than the content server computers in the first lower level. Level assignment unit 250 assigns virtual content server computer 182 to a third level, because the price of content server computer 138 more than content server computers in the lower levels. Additionally or alternatively, level assignment unit 250 may make similar assignments using relative price indicators.

In step 580, level assignment unit 250 returns the estimated equally closest content server computers grouped into levels. Continuing with the example in step 570, level assignment unit 250 may return the estimated equally closest content server computers grouped into levels to control server computer 102 to return to client computer 192. The levels may indicate to the client computer, that the client computer should request the media item(s) from each of the content server computers in the first level before the client computer should request the media item(s) from the content server computers in the second level, and so on. Additionally or alternatively, level assignment unit 250 may return the estimated equally closest content server computers grouped into levels to weighting unit 260.

4.5 Load Balancing

The bandwidth of each site containing content server computers may vary widely. For example, site 152 may have twice the bandwidth as site 154. Thus, the overall quality of experience may be better for more users if client computers make more requests to content server computers in site 152 than content server computers in site 154. In an embodiment, control server computer 102 may load balance the content server computers by indicating which server(s) the client should connect to in a particular order.

Weighting unit 260 is coupled to level assignment unit 250 and content server database 220. Weighting unit 260 may receive the estimated equally closest content server computers grouped into levels from level assignment unit 250. Weighting unit 260 may use the data stored in content server database 220 to estimate the throughput of each of the estimated equally closest content server computers within each level. Weighting unit 260 may then order each of the closest content server computers within each level, and return the ordered closest content server computers within each level to control server computer 102, which in turn may return the ordered closest content server computers within each level to the requesting client computer.

Additionally or alternatively, weighting unit 260 is coupled to closeness estimation unit 240. Weighting unit 260 may receive the estimated equally closest content server computers, not grouped into levels, from closeness estimation unit 240. Weighting unit 260 may then order each of the closest content server computers, and return the ordered closest content server computers to control server computer 102. Control server computer 102 may return the ordered closest content server computers to the requesting client computer.

Figure 6:
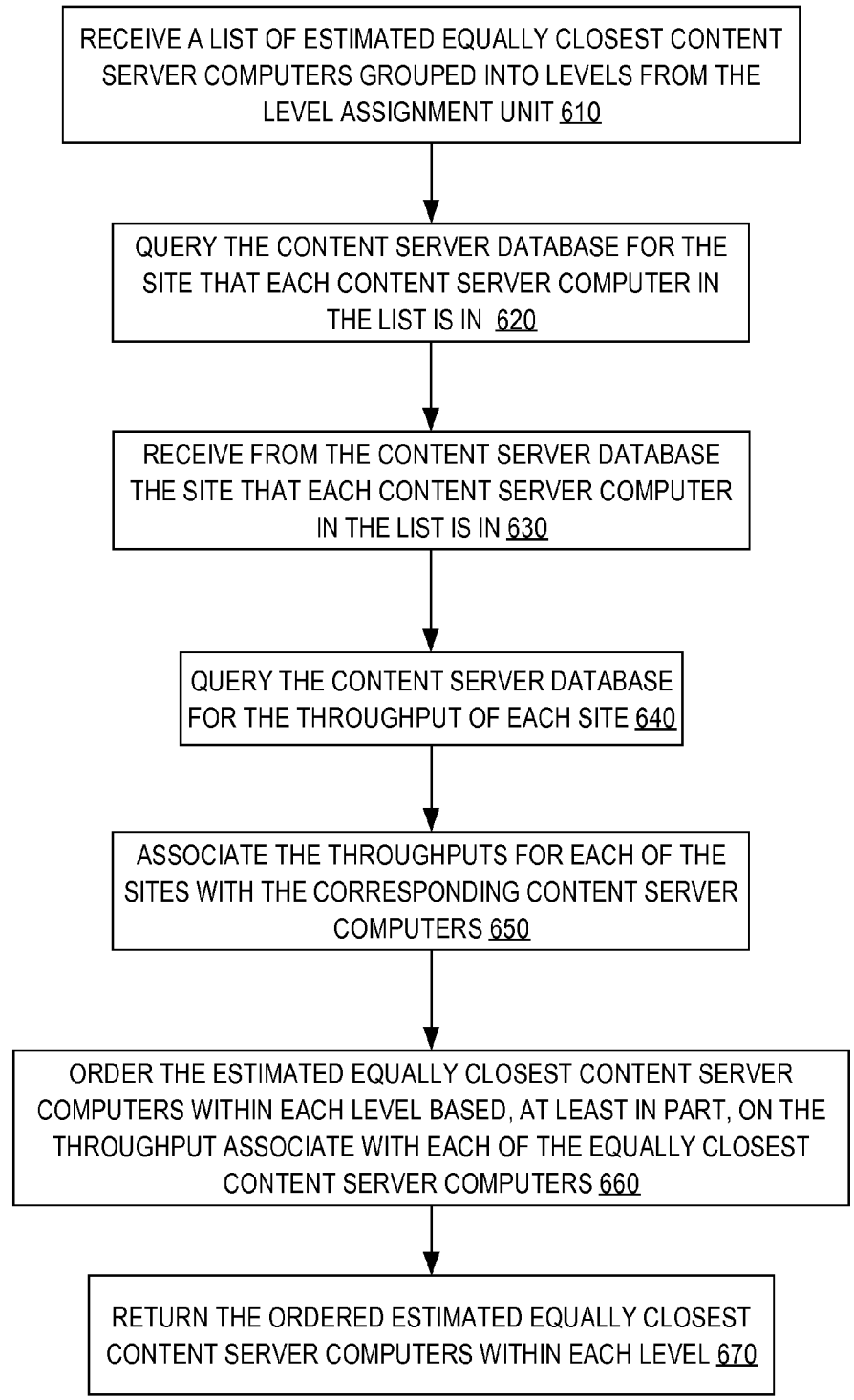
FIG. 6 illustrates a process for ordering closest content server computers within each level, in an example embodiment.

FIG. 6 illustrates a process for ordering closest content server computers within each level, in an example embodiment. While FIG. 6 illustrates example steps according to an embodiment, other embodiments may omit, add to, reorder, and/or modify any of the steps shown. For purposes of illustrating a clear example, FIG. 6 may be described using the embodiments illustrated in FIG. 1 and FIG. 2.

Referring now to FIG. 6, in step 610, weighting unit 260 receives a list of estimated equally closest content server computers grouped into levels from level assignment unit 250. For example, weighting unit 260 may receive a list from level assignment unit 250 comprising content server computer 134 and content server computer 136, grouped into a first level, and content server computer 138 and virtual content server computer 182, grouped into a second level.

In step 620, weighting unit 260 queries content server database 220 for the site that each content server computer in the list is in. Continuing with current example in step 610, weighting unit 260 queries content server database 220 to determine to which site content server computer 134, content server computer 136, content server computer 138, and virtual content server computer 182 belong.

In step 630, weighting unit 260 receives from content server database 220 the site that each content server computer in the list is in. Continuing with current example in step 620, weighting unit 260 receives from content server database 220 the list of sites to which content server computer 134, content server computer 136, content server computer 138, and virtual content server computer 182 belong, namely, site 154, site 156, site 158, and virtual site 184.

In step 640, weighting unit 260 queries content server database 220 for the throughput of each site. Continuing with current example in step 630, weighting unit 260 may query content server database 220 for the throughput of site 154, site 156, site 158, and virtual site 184.

In step 650, weighting unit 260 associates the throughputs for each of the sites with the corresponding content server computers. For purposes of illustrating a clear example, assume that site 154 is estimated to have a throughput of 100 gigabits per second, site 156 is estimated to have a throughput of 200 gigabits per second, site 158 is estimated to have a throughput of 100 gigabits per second, and virtual site 184 is estimated to have a throughput of 800 gigabits per second. Continuing with current example in step 640, weighting unit 260 may associate 100 gigabits per second with content server computer 134, 200 gigabits per second with content server computer 136, 100 gigabits per second with content server computer 138, and 1,000 gigabits per second with virtual content server computer 182.

In step 660, weighting unit 260 orders the estimated equally closest content server computers within each level based, at least in part, on the throughput associate with each of the equally closest content server computers. Continuing with current example in step 650, weighting unit 260 may have a 66% probability of ordering content server computer 136 before content server computer 134, because the estimated throughput associated with content server computer 136 is double the estimated throughput associated with content server computer 134. Weighting unit 260 may have an 80% probability of ordering virtual content server computer 182 before content server computer 138, because the estimated throughput associated with virtual content server computer 182 is five times the estimated throughput associated with content server computer 138.

Additionally or alternatively, weighting unit 260 may assign a probability to the closest content server computers within each level. Using the estimated throughputs in the previous example, weighting unit 260 may assign a probably of 66% to content server computer 136, and 33% to content server computer 134, because the estimated throughput associated with content server computer 136 is double the estimated throughput associated with content server computer 134. Furthermore, weighting unit 260 may assign a probably of 80% to virtual content server computer 182, and 20% to content server computer 138, because the estimated throughput associated with virtual content server computer 182 is five times the estimated throughput associated with content server computer 138.

In step 670, weighting unit 260 returns the ordered estimated equally closest content server computers within each level. Continuing with current example in step 660, weighting unit 260 may return the ordered estimated closest content server computers within each level to control server computer 102 to return to client computer 192. The ordered estimated closest content server computers within each level indicates to the client computer, that the client computer should request the media item title from the first server computer before the client computer should request the media item title from the second server computer. Additionally or alternatively, the probabilities assigned to each content server computers may be returned to control server computer 102 to return to client computer 192.

In an embodiment, one or more community attributes may be used to balance load between content servers in different locations. For purposes of illustrating a clear example, assume a content server computer in Atlanta is estimated to be closer to a client computer than a content server computer in Seattle and that both content server computers have the same file, but the maximum bandwidth of the Atlanta content server computer is 50% of the maximum bandwidth of the Seattle content server computer. An administrator may wish to send traffic to the Seattle content server computer even though the Atlanta content server computer is estimated to be closer for a particular client computer. Accordingly, an administrator may set one or more community attributes to indicate that the control server should ignore the Geolocation attribute when estimating closeness between a content server computer in Atlanta and a content server computer in Seattle. Additionally or alternatively, an administrator may set one or more community attributes to indicate that the control server should select a Seattle content server computer 66% of the time and an Atlanta content server computer 33% of the time for the same file if the Atlanta content server computer is estimated to be closest to the client computer and both content server computers have the same file requested by the client computer.

4.6 Fault Tolerance and Configurations

All of the content server computers that are estimated to be the closest to a particular requesting client computer may be returned. However, if a site goes down, all of the content server computers in the site may be unreachable. For example, if router 142 fails, content server computer 131 and content server computer 132 may both be unreachable. Thus, a client computer connected to a first content server computer at a first site may waste time attempting to connect to another content server computer at the same site. For example, if client computer 192 is connected to content server computer 131 when router 142 fails, then client computer 192 may waste time attempting to connect to content server computer 132.

Furthermore, in some embodiments, which are not illustrated in FIG. 1, many more than two content server computers may be included in a single site. Thus, if a router for a site goes down, which includes a content server computer that a client computer was connected to, and it takes a client computer five seconds to determine that a content server computer is unreachable, and the client computer requests data from five other content server computers that belong to the same site, then the client will waste twenty-five seconds trying to find a server that is unreachable. Thus, in response to receiving a request for information about content server computers that hold a media item title, control server computer 102 may be configured to return one content server computer per site. Accordingly, if a router at a site for a particular content server computer goes down, the next content server computer the client computer requests data from will be from a different site and through a different router.

Alternatively, control server computer 102 may return multiple content server computers from the same site. The control server computer 102 may interleave the content server computers from same site, with content server computers from other sites, such that if a client computer requests media item from content server computers in the same order in which the content server computers are returned, the client computer will not request data from the same site before trying at least one other content server computer at another site.

Additionally, the control server computer 102 may be configured to return information for at least a minimum number of content server computers that that hold a media item. For purposes of illustrating a clear example, assume that content server computer 131 and content server computer 132 each hold a copy of movie XYZ, and that no other content server computer holds a copy of movie XYZ. Further assume that control server computer 102 is configured to return information for at least two content server computers that each includes a requested media item. Also assume that control server computer 102 is configured to not return information for more than one content server computer per site. Even though control server computer 102 is configured to not return information for more than one content server computer per site, control server computer 102 may be configured by an administrator to return information for both content server computer 131 and content server computer 132 to ensure that at least two content server computers that each includes a requested media item are returned.

Control server computer 102 may have additional configurations. For example, an administrator may configure control server computer 102 to not return virtual content server computers, or other content server computers on a CDN. An administrator may also configure control server computer 102 to return information for particular content server computers or sites based, at least in part, on client computer country, device type, customer, and/or A/B testing allocations. For example, an administrator may configure control server computer 102 to return information for content server computers on one or more particular embedded or peering networks if a client computer is a particular device type.

4.7 Estimating Closeness Independently for Multiple Files for the Same Title

Each media item, such as a movie, may comprise one or more files. For example, a movie may comprise an audio file and a separate video file. One or more of the systems and methods discussed herein may be used to determine which content server to select for each of the files independently. Thus, a control server computer may determine that a first content computer at a first site is closest to a client computer for the video file, and a second content computer at a second site is the closest to the client computer for an audio file. Similarly, an audio file and/or a video file may be divided into one or more files, and one or more of the systems and methods discussed herein may be used to determine which content server to select for each of the files independently.

5.0 Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
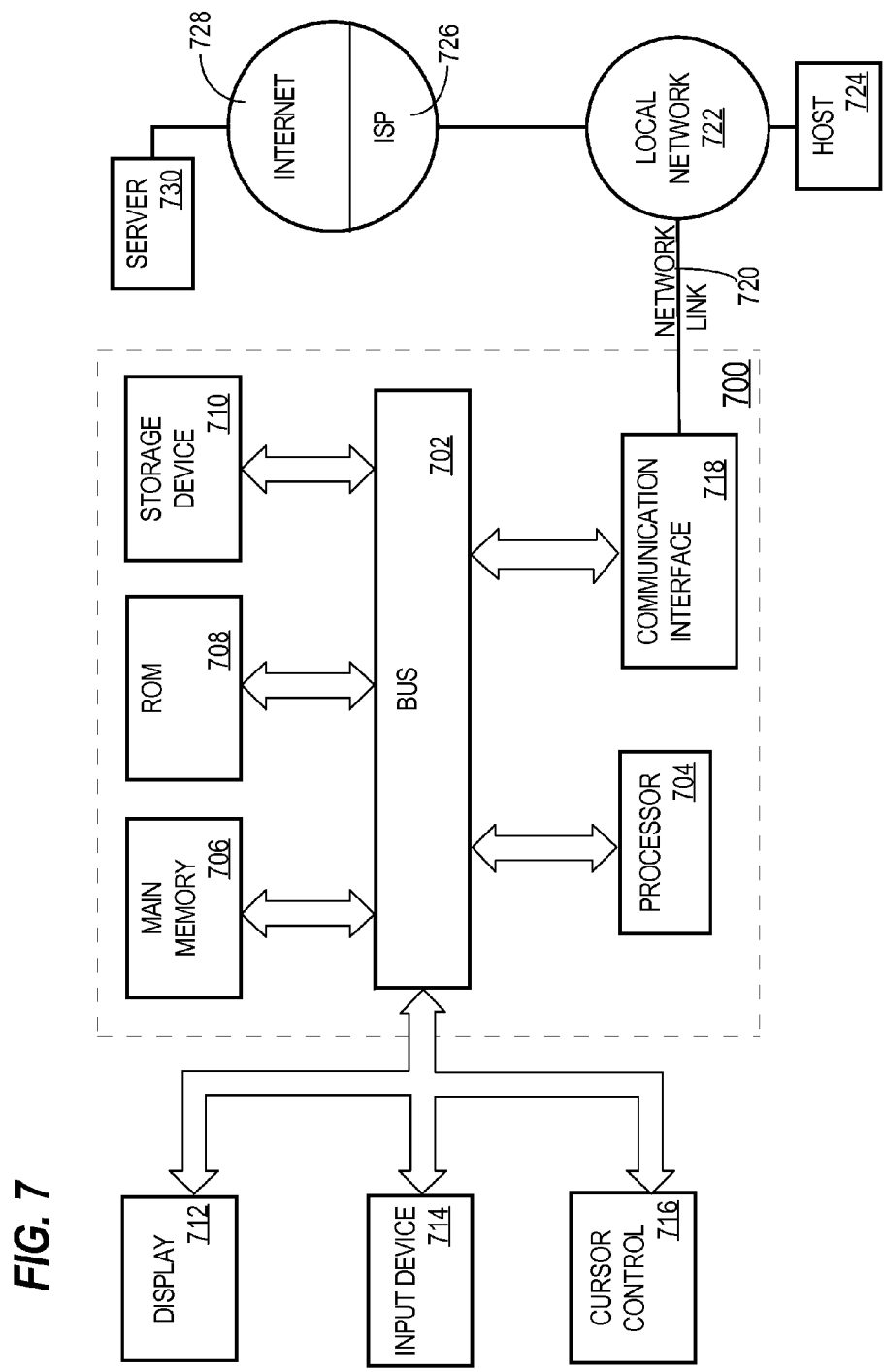
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to an embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6.0 Other Aspects of Disclosure

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Aspects of the subject matter described herein are set out in the following numbered clauses:

1. A method comprising: receiving a first routing table of a first server computer; receiving a second routing table of a second server computer; receiving a request, from a client computer, for information about content servers that hold a media item title, wherein the request includes a client internet protocol address of the client computer; estimating that the first server computer is closer to the client computer than the second server computer is to the client computer based, at least in part, on the client internet protocol address, the first routing table, and the second routing table; sending, to the client computer, a first address to the client computer based, at least in part, on estimating that the first server computer is closer to the client computer than the second server computer, wherein the first address identifies the media item title stored on the first server computer; wherein the method is performed by one or more special-purpose computing devices.

2. The method of clause 1, wherein the estimating comprises estimating that the first server computer is closer in physical location to the client computer than the second server computer is to the client computer.

3. The method of any clause 1-2 wherein the client computer is a first client computer, the request is a first request, the client internet protocol address is a first client internet protocol address; the method further comprising: receiving a second request, from a second client computer, for information about content servers that hold the media item title, wherein the second request includes a second client internet protocol address of the second client computer; estimating that the second server computer is closer to the second client computer than the first server computer is to the second client computer based, at least in part, on the second client internet protocol address, the first routing table, and the second routing table; sending, to the second client computer, a second address to the second client computer based, at least in part, on estimating that the second server computer is closer to the second client computer than the first server computer is to the second client computer, wherein the second address identifies the media item title stored on the second server computer.

4. The method of any clause 1-3 comprising: receiving a third routing table of a third server computer; estimating that the first server computer is as close to the client computer as the third server computer is to the client computer based, at least in part, on the client internet protocol address, the first routing table, and the third routing table; sending a second address to the client computer based, at least in part, on estimating that the first server computer is as close to the client computer than the third server computer is to the client computer; wherein the second address identifies the media item title stored on the third server computer.

5. The method of any clause 1-4 comprising: determining that the first server computer is behind a first router; determining that the third server computer is behind a second router; determining that the first server computer and the third server computer are at different sites based, at least in part, on determining that the first router and the second router are different routers; sending the second address to the client computer based, at least in part, on determining that the first server computer and the third server computer are at different sites.

6. The method of any clause 1-5 comprising: estimating a first bandwidth for the first server computer; estimating a second bandwidth for the third server computer; determining a first probability based, at least in part, on the first bandwidth; determining a second probability based, at least in part, on the second bandwidth; sending, to the client computer, a list of the first address and the second address in an order corresponding to magnitude of the first probability and the second probability.

7. The method of any clause 1-6 wherein: the first routing table comprises a first attribute of a particular attribute type;

the third routing table comprises a second attribute of the particular attribute type; the third routing table comprises a community value indicating to ignore the particular attribute type; estimating that the first server computer is as close to the client computer as the third server computer is to the client computer based, at least in part, on ignoring the first attribute and the second attribute.

8. The method of any clause 1-7 comprising: determining a first cost of sending data from the first server computer to the client computer; determining a second cost of sending data from the third server computer to the client computer; assigning, for the client computer, the first server computer to a first level and the third server computer to a second level when the first cost is less than the second cost; sending, to the client computer, the first address and the second address, with data indicating that the first address is assigned to the first level and the second address is assigned to the second level.

9. The method of any clause 1-8 comprising: determining that the third server computer is associated with a content delivery network; assigning, for the client computer, the first server computer to a first level and the second server computer to a second level based, at least in part, on determining that the second server computer is associated with the content delivery network; sending, to the client computer, the first address and the second address, with data indicating that the first address is assigned to the first level and the second address is assigned to the second level.

10. The method of any clause 1-9 comprising estimating that the first server computer is closer to the client computer than the second server computer is to the client computer based, at least in part, on the client computer, the device type of the client computer, country of the client computer, customer logged in to the client computer, testing protocols, internet service provider of the client computer.

11. A non-transitory computer-readable data storage medium storing one or more sequences of instructions which when executed cause one or more processors to perform any of the methods recited in clauses 1-10

12. A computer program product including instructions which, when implemented on one or more processors, carries out any of the methods recited in clauses 1-10.

13. A computing device having a processor configured to perform any of the methods recited in clauses 1-10.

What is claimed is:
1. A method comprising:
receiving a first routing table of a first server computer, wherein the first routing table includes a first autonomous systems (AS) path;
receiving a second routing table of a second server computer, wherein the second routing table includes a second AS path;
receiving a request, from a client computer, for information about content servers that hold a media item title, wherein the request includes a client internet protocol address of the client computer;
estimating that the first server computer is closer to the client computer than the second server computer is to the client computer, at least in part, by comparing a first number of AS identifiers included in the first AS path to a second number of AS identifiers included in the second AS path;
assigning a first probability to the first server computer based on a first network throughput of the first server computer;
assigning a second probability to the second server computer based on a second network throughput of the second server computer; and
sending a first address to the client computer based, at least in part, on the first probability, on the second probability, and on estimating that the first server computer is closer to the client computer than the second server computer, wherein the first address identifies the media item title stored on the first server computer;
wherein the method is performed by one or more special-purpose computing devices.

2. The method of claim 1, wherein estimating that the first server computer is closer to the client computer than the second server computer is to the client computer further comprises estimating that the first server computer is closer in physical location to the client computer than the second server computer is to the client computer.

3. The method of claim 1, wherein the client computer is a first client computer, the request is a first request, the client internet protocol address is a first client internet protocol address; the method further comprising:
receiving a second request, from a second client computer, for information about content servers that hold the media item title, wherein the second request includes a second client internet protocol address of the second client computer;
estimating that the second server computer is closer to the second client computer than the first server computer is to the second client computer based, at least in part, on the second client internet protocol address, the first routing table, and the second routing table; and
sending a second address to the second client computer based, at least in part, on estimating that the second server computer is closer to the second client computer than the first server computer is to the second client computer, wherein the second address identifies the media item title stored on the second server computer.

4. The method of claim 1 comprising:
receiving a third routing table of a third server computer;
estimating that the first server computer is as close to the client computer as the third server computer is to the client computer based, at least in part, on the client internet protocol address, the first routing table, and the third routing table; and
sending a second address to the client computer based, at least in part, on estimating that the first server computer is as close to the client computer than the third server computer is to the client computer;
wherein the second address identifies the media item title stored on the third server computer.

5. The method of claim 4 comprising:
determining that the first server computer is behind a first router;
determining that the third server computer is behind a second router;
determining that the first server computer and the third server computer are at different sites based, at least in part, on determining that the first router and the second router are different routers; and
sending the second address to the client computer based, at least in part, on determining that the first server computer and the third server computer are at different sites.

6. The method of claim 4 comprising:
estimating a first bandwidth for the first server computer;
estimating a second bandwidth for the third server computer;
determining a first probability based, at least in part, on the first bandwidth;
determining a second probability based, at least in part, on the second bandwidth; and
sending, to the client computer, a list of the first address and the second address in an order corresponding to magnitude of the first probability and the second probability.

7. The method of claim 4 wherein:
the first routing table comprises a first attribute of a particular attribute type;
the third routing table comprises a second attribute of the particular attribute type;
the third routing table comprises a community value indicating to ignore the particular attribute type; and
estimating that the first server computer is as close to the client computer as the third server computer is to the client computer based, at least in part, on ignoring the first attribute and the second attribute.

8. The method of claim 4 comprising:
determining a first cost for sending data from the first server computer to the client computer;
determining a second cost for sending data from the third server computer to the client computer;
assigning, for the client computer, the first server computer to a first level and the third server computer to a second level when the first cost is less than the second cost; and
sending, to the client computer, the first address and the second address, with data indicating that the first address is assigned to the first level and the second address is assigned to the second level.

9. The method of claim 4 comprising:
determining that the third server computer is associated with a content delivery network;
assigning, for the client computer, the first server computer to a first level and the second server computer to a second level based, at least in part, on determining that the second server computer is associated with the content delivery network; and
sending, to the client computer, the first address and the second address, with data indicating that the first address is assigned to the first level and the second address is assigned to the second level.

10. The method of claim 1 comprising estimating that the first server computer is closer to the client computer than the second server computer is to the client computer based, at least in part, on the client computer, device type of the client computer, country of the client computer, customer logged in to the client computer, testing protocols, internet service provider of the client computer.

11. The system of claim 1, wherein comparing the first number of AS identifiers included in the first AS path to the second number of AS identifiers included in the second AS path comprises determining that the first number of AS identifiers is less than the second number of AS identifiers.

12. The system of claim 1, wherein the first routing table further includes a first multi-exit discriminator (MED) attribute, the second routing table includes a second MED attribute, and estimating that the first server computer is closer to the client computer than the second server computer is to the client computer is further based on comparing the first MED attribute to the second MED attribute.

13. A computer system comprising:
a processor;
a memory; and
a processing module configured to:
receive a first routing table for a first server computer, wherein the first routing table includes a first autonomous systems (AS) path;
receive a second routing table for a second server computer, wherein the second routing table includes a second autonomous systems (AS) path;
receive a request, from a client computer, for information about content servers that hold a media item title, wherein the request includes a client internet protocol address of the client computer;
estimate that the first server computer is closer to the client computer than the second server computer is to the client computer, at least in part, by comparing a first number of AS identifiers included in the first AS path to a second number of AS identifiers included in the second AS path;
assign a first probability to the first server computer based on a first network throughput of the first server computer;
assign a second probability to the second server computer based on a second network throughput of the second server computer; and
send a first address to the client computer based, at least in part, on the first probability, on the second probability, and on estimating that the first server computer is closer to the client computer than the second server computer, wherein the first address identifies the media item title stored on the first server computer.

14. The system of claim 13, wherein the processing module is configured to estimate that the first server computer is closer to the client computer than the second server computer is to the client computer based, at least in part, on estimating that the first server computer is closer in physical location to the client computer than the second server computer is to the client computer.

15. The system of claim 13, wherein:
the client computer is a first client computer, the request is a first request, the client internet protocol address is a first client internet protocol address; and
the processing module is configured to:
receive a second request, from a second client computer, for information about content servers that hold the media item title, wherein the second request includes a second client internet protocol address of the second client computer;
estimate that the second server computer is closer to the second client computer than the first server computer is to the second client computer based, at least in part, on the second client internet protocol address, the first routing table, and the second routing table; and
send a second address to the second client computer based, at least in part, on estimating that the second server computer is closer to the second client computer than the first server computer is to the second client computer, wherein the second address identifies the media item title stored on the second server computer.

16. The system of claim 13, wherein the processing module is configured to:
receive a third routing table of a third server computer;
estimate that the first server computer is as close to the client computer as the third server computer is to the client computer based, at least in part, on the client internet protocol address, the first routing table, and the third routing table; and send a second address to the client computer based, at least in part, on estimating that the first server computer is as close to the client computer than the third server computer is to the client computer;

wherein the second address identifies the media item title stored on the third server computer.

17. The system of claim 16, the processing module is configured to:

determine that the first server computer is behind a first router;

determine that the third server computer is behind a second router;

determine that the first server computer and the third server computer are at different sites based, at least in part, on determining that the first router and the second router are different routers; and send the second address to the client computer based, at least in part, on determining that the first server computer and the third server computer are at different sites.

18. The system of claim 16, wherein the processing module is configured to:

estimate a first bandwidth for the first server computer;

estimate a second bandwidth for the third server computer;

determine a first probability based, at least in part, on the first bandwidth;

determine a second probability based, at least in part, on the second bandwidth; and send, to the client computer, a list of the first address and the second address in an order corresponding to magnitude of the first probability and the second probability.

19. The system of claim 16, wherein:

the first routing table comprises a first attribute of a particular attribute type;

the third routing table comprises a second attribute of the particular attribute type;

the third routing table comprises a community value indicating to ignore the particular attribute type; and the processing module is configured to estimate that the first server computer is as close to the client computer as the third server computer is to the client computer based, at least in part, on ignoring the first attribute and the second attribute.

20. The system of claim 16, wherein the processing module is configured to:

determine a first cost for sending data from the first server computer to the client computer;

determine a second cost for sending data from the third server computer to the client computer;

assign, for the client computer, the first server computer to a first level and the third server computer to a second level when the first cost is less than the second cost; and send, to the client computer, the first address and the second address, with data indicating that the first address is assigned to the first level and the second address is assigned to the second level.

21. The system of claim 16, wherein the processing module is configured to:

determine that the third server computer is associated with a content delivery network;

assign, for the client computer, the first server computer to a first level and the second server computer to a second level based, at least in part, on determining that the second server computer is associated with the content delivery network; and send, to the client computer, the first address and the second address, with data indicating that the first address is assigned to the first level and the second address is assigned to the second level.

22. The system of claim 13, wherein the processing module is configured to estimate that the first server computer is closer to the client computer than the second server computer is to the client computer based, at least in part, on the client computer, device type of the client computer, country of the client computer, customer logged in to the client computer, testing protocols, internet service provider of the client computer.

* * * * *